April 1, 1947. G. L. TILBROOK 2,418,207
RYTHMETER FOR DETERMINING STERILITY AND FERTILITY
Filed June 9, 1945 3 Sheets-Sheet 1

INVENTOR.
Gilmore L. Tilbrook
BY
Harry Lea Dodson

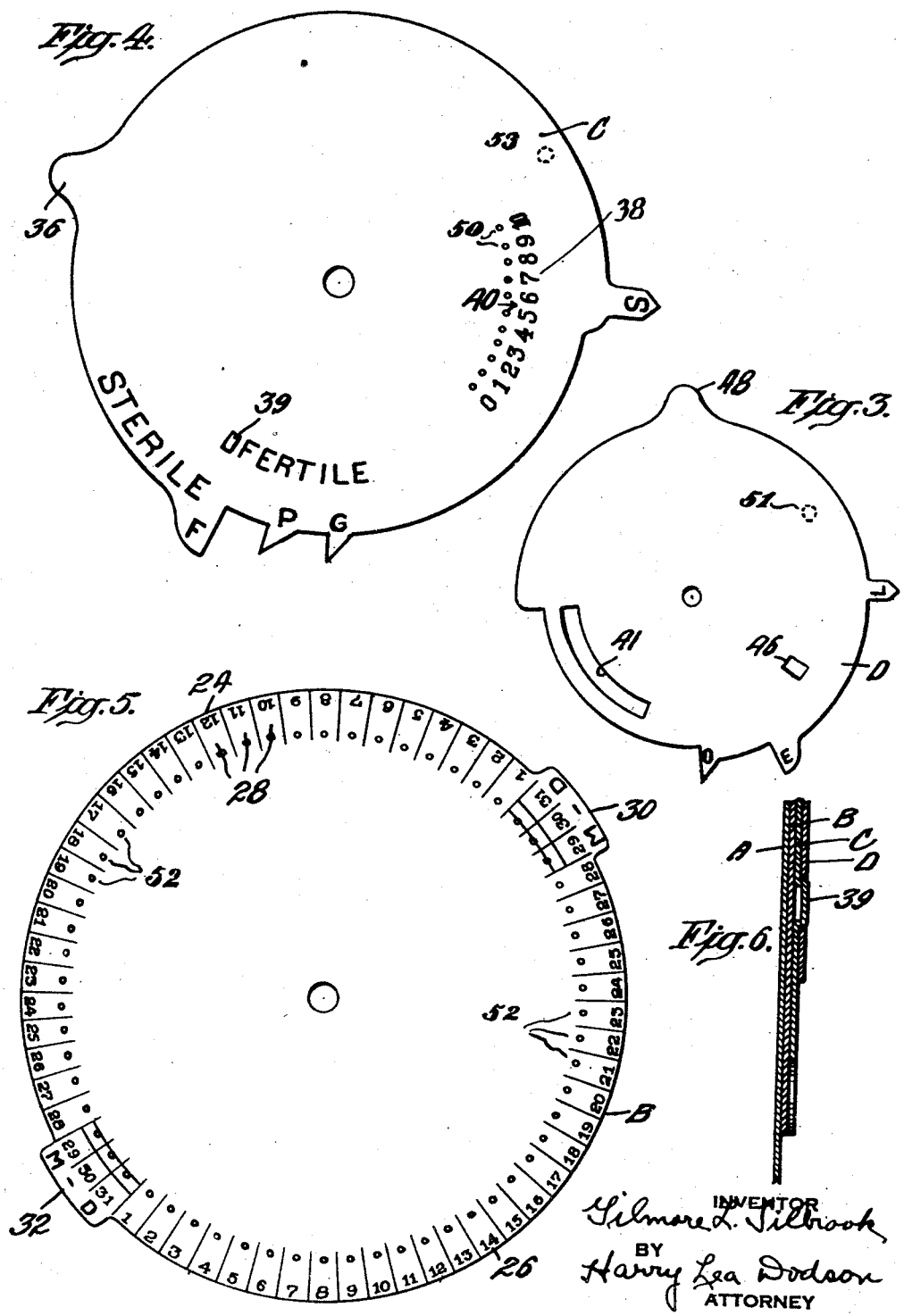

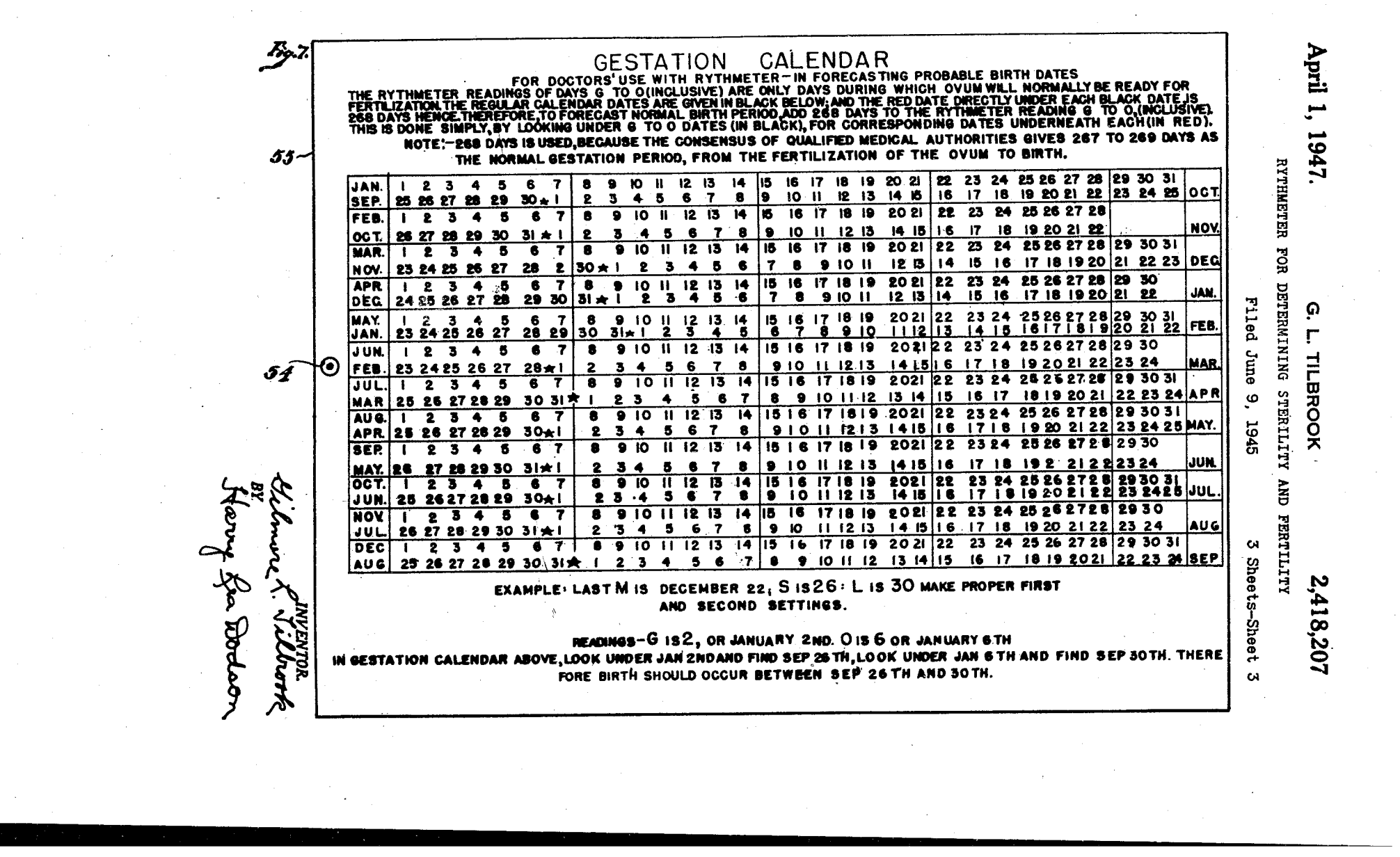

April 1, 1947.     G. L. TILBROOK     2,418,207
RYTHMETER FOR DETERMINING STERILITY AND FERTILITY
Filed June 9, 1945     3 Sheets—Sheet 3

INVENTOR.
Gilmore L. Tilbrook
BY
Harry Lea Dodson

Patented Apr. 1, 1947

2,418,207

UNITED STATES PATENT OFFICE 2,418,207

RYTHMETER FOR DETERMINING STERILITY AND FERTILITY

Gilmore L. Tilbrook, Washington, D. C.

Application June 9, 1945, Serial No. 598,497

3 Claims. (Cl. 40—115)

My invention relates to the device described in my United States Letters Patent Reissue No. 22,692.

My present invention has for its object to provide an accurate and scientific means to determine the probable birth dates with greater accuracy than is now done, not only for human beings, but also for animals. It can be easily seen that such a device will be of great utility in connection with the raising of blooded stock. It has been determined by clinations that there are certain constants in connection with the time of removal of the ovum from the body if it has not been fertilized. The constant after ovum is deposited in the uterus for humans is 15 days until the next succeeding menstruation.

There has also been established a constant for the period of gestation from the date of the fertilization of the ovum. In my Rythmeter I use 267 to 269 days as the normal gestation period, from the fertilization of the ovum to birth. By the use of my Rythmeter I am able to determine within closer limits than has been possible prior to my invention. Formerly, the latter has, however, almost always, been calculated from the date of the last menstruation. It has now been determined that this calculation is substantially erroneous because it has no relation with the new ovum which is "laid" after the last menstruation, and is in the uterus awaiting fertilization, and from which a child will be born, approximately 268 days later, if the ovum is fertilized. If the ovum is not fertilized within approximately five hours after deposition in uterus then nature sets in motion through the glandular system an action which removes this unfertilized ovum from the body fifteen days later which is the next menstruation. The use of my Rythmeter enables doctors to observe the constant of fifteen days before the next menstruation, which is the number of days the ovum remains in the uterus of a human female before it is removed by nature, providing of course, that it has not been fertilized.

It is well known to the medical profession and to research authorities that this constant varies for different mammals, for example, for monkeys it is 13 days, for cows 9 days, etc. It is a simple matter to change the "Rythmeter" for any desired constant and so be able to determine with a very close approximation the day the calf, etc., will be born.

My means of accomplishing this result may be more readily apprehended by having reference to the accompanying drawings which are hereunto annexed and made a part of this specification in which—

Fig. 3 is a plan view of the top disk;

Fig. 4 is a plan view of one intermediate disk;

Fig. 5 is a plan view of another intermediate disk;

Fig. 6 is a fragmentary detail view taken on line 6—6 in Fig. 1, and

Fig. 7 is a gestation calendar which is pivotally attached to the base of the device.

Similar reference numerals refer to similar parts throughout the entire specification.

Figures 1, 2:
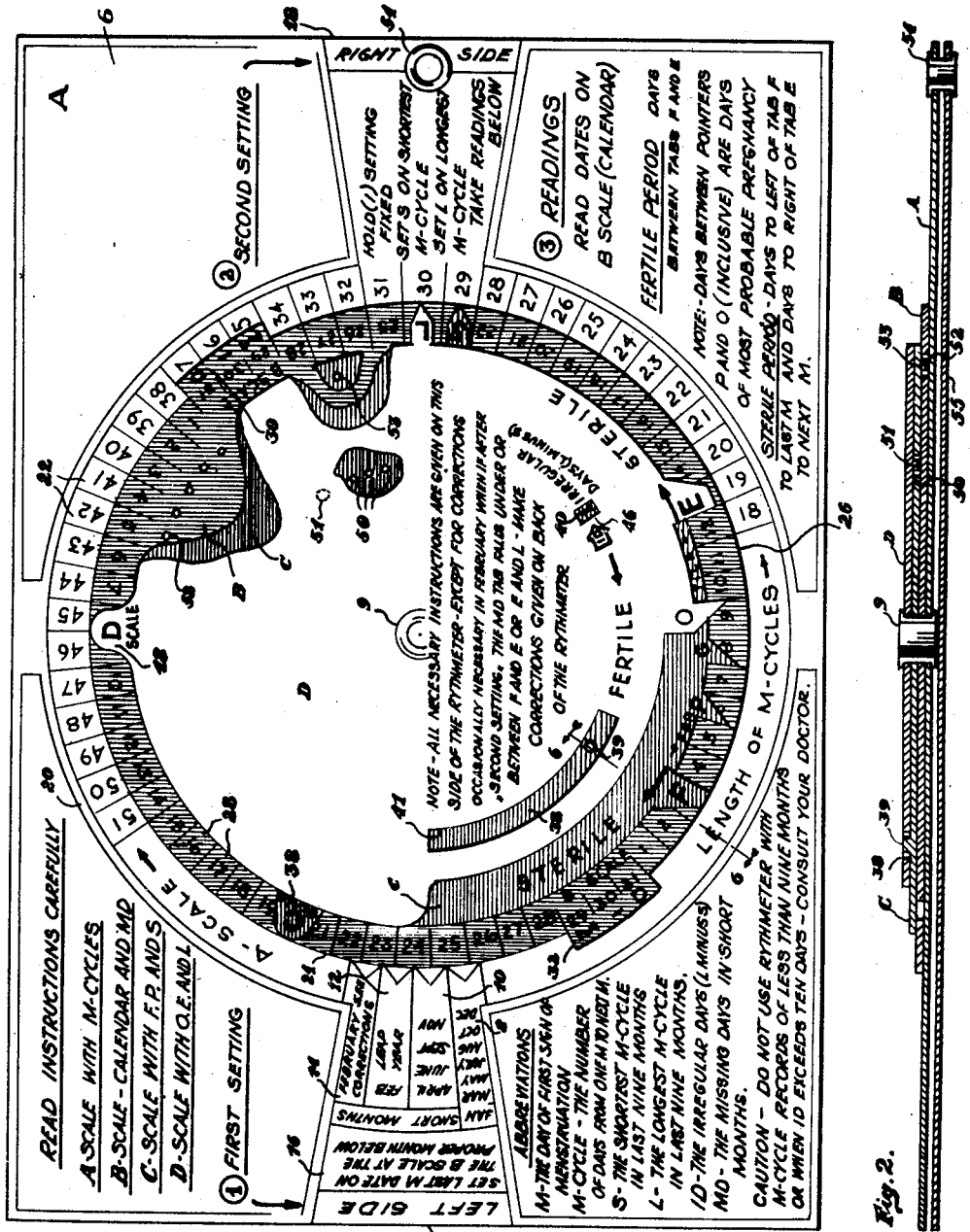
Fig. 1 shows the front of my improved device with a portion of the disk broken away to show the construction of adjacent disks.
Fig. 2 is a cross section through the center of Fig. 1.

As described in my patent above referred to and in the drawings hereof, the "Rythmeter" consists of a base 6, hereinafter designated as scale A. At the center of this base is located a pin 9. Upon the pin 9 I mount three rotatable disks B, C, and D, each of which has a central opening to receive the pin 9. These disks are superimposed upon the base 6 and one another respectively. They are rotatable upon the pin 9, with relation to the base 6 and to each other. These various parts are provided with lugs, indicia, and apertures which provide the means for attaining the objectives when employed in accordance with my invention.

On the base 6 which for convenience is called scale A is scribed a circle 20, a portion of which is divided by radial line segments 22 arranged within the circle 20. These segments 22 have printed or stamped thereon a numeral sequence preferably beginning with the numeral 18, and as shown extending to numeral 51. As indicated in this circle these numbers correspond to the length in days of the menstrual cycle. It will be understood that for animals which have less than a twenty day menstrual cycle, additional numerals may be provided.

At the left of this circle 20, there is provided a space 7, which is divided into a number of columns 8, 10, 12, and 14. The first one, 8, contains the name of the longer months. The second 10, second column contains the names of the shorter months. The third, 12, contains the name of the month of February in leap year, while the fourth, 14, contains the name of February in its regular twenty-eight day period. At the top of these columns in a space designated 16, are instructions for the first step in the operation. At a point preferably diametrically opposite the space 7 is a space 18, marked second step, similar in outline to the space 7. This space 18 is marked second step and contains instructions for the second step in using the device. The surface of the scale or disc B is divided into two semi-circles 24 and 26, each of which has a plurality of equally spaced segments 28, bearing the numbers 1 to 31 consecutively. These numbers which correspond to the calendar days are located adjacent the periphery of disc B, and register with the segments 22 on disc A. The disc B is provided with lugs 30 and 32, which are marked M—D (meaning missing days) and extend outwardly from the periphery of the disc B at points diametrically opposite each other and located opposite the segments 28, which bear the numerals 29, 30 and 31.

The scale or disc C which is also mounted on the pin 9 has outwardly extending lugs marked F, P, S and G, respectively. This lug G is located two spaces to the right of P on the disc C, because the period between G and O are the only days during which the ovum could be present in the uterus for fertilization. There is also provided a projection 36 which extends radially and serves as a handle for conveniently rotating this disc. Lug S is the pointer for the shortest "M-cycle." Lug P is the start of the "most probable pregnancy days"—the first day. Lug F is the last day of the first "sterile period." As shown there are 17 spaces between the left side of the S lug, and the right side of the P lug as viewed in Fig. 1, and there are two spaces between the left of the P and the right side of the F lug. The periphery between F and S is slightly undercut, with the exception of the lug P. A segment 38, of an annulus on the disc C bears a series of numbers 40 preferably printed dark on a white background as shown in Figure 4.

Opposite the lug P on the same radius as the segment 38 appears the word Fertile also on a segment of an annulus. A detent 39 is formed at the beginning of this word to engage an arcuate slot 41 in disc D and prevents its movement beyond a predetermined point.

As referred to above I provide a third rotatable disc known as scale D which is superimposed on disc C and rotates on pin 9. This disc has three radially extending lugs designated respectively O (probable pregnancy), E (fertile period), and L (longest in menstrual period). The space between L and O is the constant herein before referred to.

Referring to the drawings it will be seen that there is an arcuate slot 41 in which the detent 39 moves. The dark segment 38 of scale C is also visible when in register therewith. A window 46, in scale D is positioned to register with a series of numerals 40 to show the number of irregular days.

It will be clear that when the disc D is rotated until the detent 39 abuts the end of the arcuate slot 41 the disc can not move enough to bring the window 46 beyond the numeral 10, that is because it has been decided by medical authorities, that any irregularity in menstruation which extends ten days, in a period of eight or nine months is a pathological case, and can not use this method for planning parenthood.

A lug 48 extends from the periphery of disc D which serves as a handle on scale D for rotation purposes.

I have found it desirable to provide means to lock certain discs together so that the two will move as a unit after being once set. I accomplish this by punching a series of depressions or holes in the disc C which are engaged by an upwardly extending boss 51 on disc D. It should be noted that this boss 51 is depressed downwardly to engage any one of the series of holes 50 in the disc C. Upon the base or scale A, I form one or more upwardly extending bosses or projections 53 which are adapted to engage any one of a series of holes 52, formed on scale or disc B. One for each of the 62 days shown thereon whereby to lock disc A to disc B upon the proper setting of M. Attached to the base or disc A by means of a pivot or pin 54, is a gestation chart or calendar 55. This calendar 55 is provided upon its face with a complete breakdown of any predetermined date and also supplies an example which has been worked out so the doctor can determine almost at a glance when the birth will occur.

To illustrate the operation of my invention I provide a hypothetical case, although it is well known that at least eight menstrual cycle-histories should be used in determining the longest and shortest periods, experienced, I shall take only two for illustrative purposes.

Thus, supposing the patient's dates to be July 3rd, August 25th. As explained above I place the numeral 3 on scale B opposite column 8 on scale A, this is for the date July 3rd, since the next menstrual day was August 1st. I read on scale B and see that opposite the numeral 1 of scale B is the number 28 on scale A. Thus the menstrual cycle was a twenty-eight day period.

Repeating the process, I place the numeral 1 on scale B opposite the month of August on scale A. Then since the next menstrual day was August 25th, I read opposite 25 on scale B and find 24 on scale A. Thus this period was a 24 day cycle. Taking these two dates to be the longest and shortest menstrual period found in at least an eight months' computation, I now proceed to determine the period of most likely fertility.

I set scale B so that the starting day of the last menstrual period is placed opposite the month in which it occured.

Suppose for example, the first menstrual day of last period was January 2nd, employing scale B rotate it until 2 is opposite the column for January it will be found to be column 8. Then set lug L on scale D over the numeral on scale A which was the longest menstrual cycle found in the above computation, namely 28.

Then set lug S of scale C in a like manner for the shortest period experienced, namely 24 days on scale A. Finally reading on scales C—D, P—O are the most fertile days and F—E are the general fertile days. Reading on Chart B all the days left to F to first menstrual day of the last period and right from E to the next menstrual day, conception is deemed impossible.

Looking at window 46, it is seen that the numeral 4 appears. This indicates four days irregularity in menstrual period, namely 28 minus 24 days respectively, as noted above.

There are various corrections needed to be provided for. Thus whenever the lug L on scale D, falls on or splits the lugs M—D, on scale B a correction is needed because a short month is being employed, the month of February, in a leap year, or the month of February in a normal year, or thirty day months has been used in the calculations.

Briefly I provide for these corrections as follows:

Corrections: For short months—No MD lug corrections are necessary in 30-day months (April, June, September, and November) except where doctors wish to get readings P to O exactly as follows: If after making first and second settings, the readings show:

(a) 31 on MD lug, falling under E or L, or under spaces between E and L; then correct readings by moving both F and E one space to left. (While holding first setting fixed.)

(b) 31 on MD lug, falling under spaces between F and E; then correct readings by moving only F, one space to left (while holding first setting fixed).

February corrections:

(a) When MD lug falls either under or partially under or between E and L; after making usual (1) and (2) settings; then correct readings by moving both F and E three spaces to left (only two spaces in leap years), while holding A and B fixed at (1) setting.

(b) When MD lug falls entirely between F and E, or partially under F, after making the usual (1) and (2) settings; then correct readings by moving only F three spaces to left (only two spaces in leap years) while holding A and B fixed at (1) setting.

Upon placing the D scale in proper position the boss 51 will engage one of the holes 50 and the discs C and D will move as a unit without re-setting. The boss 53 will, when the disc B is properly set, engage one of the holes 52 in disc B. Thus it is possible to move the locked discs C and D as a unit over locked discs A and B without changing the setting of either one. It should be clear from the foregoing description that if it were desired to manufacture a "Rythmeter" for say monkeys, it would only be necessary to change the constant L to O to 13 days and the constant S to G to 13 days, instead of the 15 days described for the "Rythmeter" for the use of human beings. The other lugs can be left in the same relative positions with reference to O and G on the D and C discs correspondingly.

It is obvious from the above that similar changes may be made for the constants of the other various species of mammals.

Having described my invention what I regard as new and desire to protect by Letters Patent is:

1. A device for ascertaining the fertile periods of females comprising; a base having indicia thereon, centering means on said base, three discs, lower, intermediate, and top, superimposed on said base and rotatably mounted on said centering means for manual rotation thereon, the lower disc being divided into two semi-circles each semi-circle marked in thirty-one equal segments bearing day of the month numerals, lugs extending outwardly adjacent numerals 29, 30 and 31, each lug bearing indicia indicating missing days, the intermediate disc having a plurality of spaced radial lugs bearing indicia thereon to designate fertile and sterile periods, said disc bearing in arcuate form the word "Fertile" spaced from its periphery, a sequence of numerals from 0 to 10 arranged in an arc on said disc and on the same radius, the top disc having apertures adapted to register with said numerals and said word respectively, means to prevent the rotation of the top disc beyond a predetermined point, a radial lug on said top disc to indicate the longest menstrual period, a second radial lug on said top disc twelve spaces from said longest period lug provided with indicia to designate the start of the last sterile period and a third radial lug located three spaces from the last named lug provided with indicia to indicate the pregnancy period, a radial lug on the intermediate disc two spaces to the right of the fertile period lug, and a gestation calendar pivotally attached to said base, said calendar having directions printed thereon.

2. A device for ascertaining the fertile periods of females comprising; a base having indicia thereon, centering means on said base, three discs, lower, intermediate, and top, superimposed on said base and rotatably mounted on said centering means for manual rotation thereon, the lower disc being divided into two semi-circles each semi-circle marked in thirty-one equal segments bearing day of the month numerals, lugs extending outwardly adjacent numerals 29, 30 and 31, each lug bearing indicia indicating missing days, the intermediate disc having a plurality of spaced radial lugs bearing indicia thereon to designate fertile and sterile periods, said disc bearing in arcuate form the word "Fertile" spaced from its periphery, a sequence of numerals from 0 to 10 arranged in an arc on said disc and on the same radius, the top disc having apertures adapted to register with said numerals and said word respectively, means to prevent the rotation of the top disc beyond a predetermined point, a radial lug on said top disc to indicate the longest menstrual period, a second radial lug twelve spaces from said longest period lug provided with indicia to designate the start of the last sterile period and a third radial lug located three spaces from the last named lug provided with indicia to indicate the pregnancy period, a radial lug on the intermediate disc two spaces to the right of the fertile period lug on said disc, a pivot pin at one end of said base, and a gestation calendar mounted on said pivot pin, said calendar having directions printed thereon.

3. A device for ascertaining the fertile periods of females comprising; a base having indicia thereon, centering means on said base, three discs, lower, intermediate and top, superimposed on said base and rotatably mounted on said centering means for manual rotation thereon, the lower disc being divided into two semi-circles each semi-circle marked in thirty-one equal segments bearing day of the month numerals, lugs extending outwardly adjacent numerals 29, 30 and 31, each lug bearing indicia indicating missing days, the intermediate disc having a plurality of spaced radial lugs bearing indicia thereon to designate fertile and sterile periods, said disc bearing in arcuate form the word "Fertile" spaced from its periphery, a sequence of numerals from 0 to 10 arranged in an arc on said disc and on the same radius, the top disc having apertures adapted to register with said numerals and said word respectively, means to prevent the rotation of the top disc beyond a predetermined point, a radial lug on said top disc to indicate the longest menstrual period, a second radial lug on said top disc twelve spaces from said longest period lug provided with indicia to designate the start of the last sterile period and a third radial lug located three spaces from the last named lug provided with indicia to indicate the pregnancy period, means for detachably locking the top and intermediate discs so they will move as a unit and means to detachably lock the lower disc to the base after setting same, a radial lug on the intermediate disc two spaces to the right of the fertile period lug, and a gestation calendar pivotally attached to said base, said calendar having directions printed thereon.

GILMORE L. TILBROOK.

REFERENCES CITED

The following references are of record in the file of this patent:

UNITED STATES PATENTS

| Number | Name | Date |
|---|---|---|
| 1,327,317 | Fuller | Jan. 6, 1920 |
| Re. 22,692 | Tilbrook | Nov. 13, 1945 |